Figure 1:
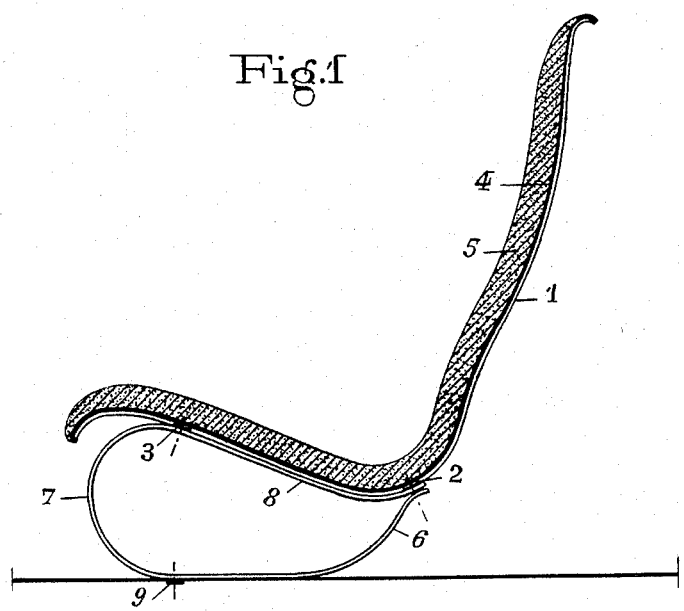

Jan. 10, 1939.        L. ASSALIT        2,143,534
SEAT FOR VEHICLES
Filed Jan. 30, 1937

INVENTOR:
LOUIS ASSALIT
BY Haseltine Lake & Co.
ATTORNEYS

Patented Jan. 10, 1939

2,143,534

UNITED STATES PATENT OFFICE 2,143,534

SEAT FOR VEHICLES

Louis Assalit, Marseille, France

Application January 30, 1937, Serial No. 123,248
In France February 24, 1936

7 Claims. (Cl. 155—54)

The present invention relates to improvements in or relating to seats for vehicles.

The general object of the invention is to improve the construction and suspension of such seats in order to afford the occupant every desirable comfort.

More precisely an object of the invention is to provide a seat which is characterized by a back portion and its seating portion, which may be formed of either rigid or flexible inextensible surfaces, mounted on a rigid frame, which may, if desired, be articulated.

These surfaces and, if necessary, their supporting frame are so mounted that they cannot be subjected to any relative displacement, movement or deformation either oscillatory or otherwise emanating from the actions of the vehicle and the reactions of the occupant, neither in a vertical direction which is more or less perpendicular to the seating portion and parallel to the back portion in the case of the seating portion, nor in a horizontal direction which is more or less perpendicular to the back portion and parallel to the seating portion in the case of the back portion.

These conditions radically obviate the movements of the occupant's body over, and friction with, the back or seating portions occurring when the occupant's body follows the movements or deformations of either the back or seating portions and these movements are not shared by the seating or back portions respectively, which movements and friction, particularly those in respect of the seating portion, cause serious inconvenience to and mar the comfort of the occupant.

Bearing surfaces are mounted with the frame, if necessary, in forms suitable for each application. These surfaces may or may not be covered, according to their nature, with any suitable upholstery, which is intended solely to ensure comfort and softness but not to form spring suspension means for the occupant of the seat.

A further object of the invention is to provide a seat which is characterized by the securing of the aforesaid rigid combination of the seating and back portions, on a damped suspension system which is preferably constituted by one or more springs of a form suitable for damping its or their reactions or oscillations.

The damping may be effected by:

(a) Mutual asynchronization of the periodic times of oscillation of two springs, for example curved leaf springs, of different section or length, one of which is disposed within the other, the ends of said springs being connected so as to be capable of reacting mutually to damp any oscillation imparted to them.

(b) Asynchronization of the periodic times of oscillation of the two branches of different section or length of a spring, the free ends of the branches of which are coupled together and mutually react to damp any oscillations imparted to the spring.

This second case is only a simplification of the former, and may be considered as if the lower part of the inner spring of the first arrangement were turned through 180° and instead of curving in the rearward direction, were curved in the forward direction and merged with the lower branch of the larger spring.

The suspension system, which may be constituted by bands, strips, rods or the like of metal or any other appropriate material, is connected to the rigidly combined seating and back portion at one or more points judiciously determined in order to obtain the maximum absorption and damping of the actions of the vehicle on the seat and of the reactions of the latter and of its occupant, it also being possible to use any other system of damping.

The invention is therefore characterized by a combined seat and back formed of inextensible surfaces mounted on a rigid frame, the said seat and back being non-deformable with respect to each other, while the combination is mounted on a damped suspension system.

A seat constructed in accordance with the improvements according to the present invention is illustrated somewhat diagrammatically in the accompanying drawing, which are given by way of example, but may also serve as a constructional example for an embodiment of the invention.

Figure 2:
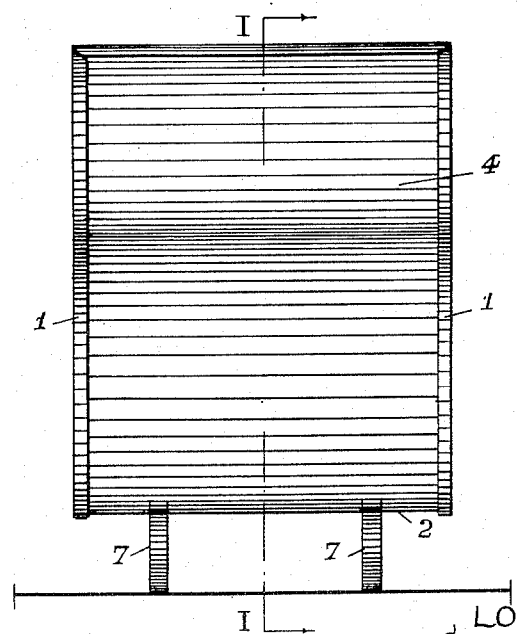

In the drawing:

Figure 1 is a side view in longitudinal section on the line I—I of Figure 2, of the combination of the principal parts constituting the seat, while Figure 2 is a rear view of the same seat.

The seat is essentially constituted by two parts, that is, the supporting part comprising the seating and back portions, and the damped suspension part.

The supporting parts comprising the combination of the back and seating portions is constituted by a frame comprised of flat steel bands formed by two longitudinal members 1 extending along each longitudinal edge on the outside of the seat and following the contour of the back and seating portions. It further comprises two transverse members 2 and 3 of the same steel, which connect the longitudinal members under the seating portion. These two transverse members are welded or otherwise secured at their extremities to the longitudinal members, and are illustrated in section in Figure 1, the transverse member 2 being at the rear and the transverse member 3 at the front. A thin sheet of metal 4 is welded or riveted to the frame thus formed, thin upholstery 5 and its covering being secured to the metal sheet by known means. The upholstery is preferably constituted by rubber sponge. It may be provided with harder rubber for the seating portion and with softer rubber for the back portion, while remaining of the same thickness, or the upholstery on the back and seating portions may be of different thicknesses.

The damped suspension part comprises two similar springs 7, disposed one on either side of the seating portion. Each spring 7 is in the form of two oscillating branches, the node of oscillation of the branches being the point 9 at which the spring is secured to the floor of the vehicle. The upper and longer branch 8 follows the contour of the seating portion, whilst the lower and shorter branch 6 is curved up from the floor and joins the extremity of the upper branch 8.

These two springs 7 are each secured by any appropriate means to the combined seating and back portion at the two points where they intersect the transverse members 2, 3. The front transverse member 3 is secured to the front top portion of the branches 8 of the springs 7, while the rear transverse member 2 is secured to both the extremities of the upper branches 8 of the springs 7 and also to the extremities of the lower branches 6 of the said spring 7.

The above described arrangement constitutes the suspension part which is damped by asynchronization of the periodic times of oscillation of the branches 6 and 8 the extremities of which are in contact, as has already been described.

Each spring 7 may be secured to the floor at the point 9 by any suitable means, which may be fixed or may permit of displacing the seat forwards or backwards, or upwards or downwards, or even of making it rock forwards.

The improved seat according to the present invention is not to be limited to any particular shape, dimensions and materials, which may vary without departing from the scope of the invention which has hereinbefore been described.

What I claim and desire to secure by Letters Patent of the United States is:

1. In a seat structure for a vehicle, including a rigid frame, a back portion and a seat portion secured upon said frame in mutually fixed relative positions, the combination of means upon said back and seat portions contributing softness and comfort to said portions for a user independently of any suspension for said structure, and a damped or asynchronized spring suspension system carrying said rigid frame and comprising at least one unitary spring member formed of a flat strip of metal bent to form a continuous loop in the forward direction with a portion of the branch of the spring generally conforming to the shape of, and being secured to the bottom of said frame beneath the seat portion, while a portion of the other or lower branch of said spring conforms to shape of the floor of said vehicle and rests on the same, and the ends of the two branches of the spring are brought up to the bottom of the frame beneath the rear of the seat portion and secured together.

2. A seat structure according to claim 1 wherein the rigid frame comprises a plurality of longitudinal frame members and spaced transverse bracing members connecting said longitudinal frame members, said transverse bracing members being directly attached to the seat and back portions of the structure.

3. A seat structure according to claim 1 wherein the means contributing softness and comfort to the seat and back portions consists of upholstery.

4. A seat structure according to claim 1 wherein the rigid frame comprises a plurality of longitudinal frame members and spaced transverse bracing members connecting said longitudinal frame members, and the seat and back portions comprise a shaped sheet of metal secured to said transverse bracing members, while the means upon said seat and back portions contributing to the softness and comfort of the same consists of upholstery.

5. A seat structure according to claim 1 wherein two similar spring members are provided one at each side of the seat structure, the forward loop portions having a different period of vibration than the rear portions of the spring members so as to cancel rocking and vibratory movements of the vehicle.

6. A seat structure according to claim 1 wherein the rigid frame comprises a plurality of longitudinal frame members and spaced transverse bracing members connecting said longitudinal frame members, and wherein the upper branch of the spring terminates beneath the seat portion at the rear thereof, while the lower branch is brought up to said seat portion from the floor and secured to the end of the upper branch beneath the rear of said seat portion.

7. A seat structure according to claim 1 wherein the rigid frame comprises a plurality of longitudinal frame members and spaced transverse bracing members connecting said longitudinal frame members, and wherein the means contributing softness and comfort to the back and seat portions comprises upholstery upon said back portion having a pre-determined degree of softness, and relatively harder upholstery disposed on the seat portion.

LOUIS ASSALIT.